United States Patent [19]

Starr

[11] Patent Number: 4,818,706

[45] **Date of Patent: *Apr. 4, 1989**

[54] REAGENT-DISPENSING SYSTEM AND METHOD

[75] Inventor: Maurice Starr, Indianapolis, Ind.

[73] Assignee: American Monitor Corporation, Indianapolis, Ind.

[*] The portion of the term of this patent subsequent to Mar. 5, 2002 has been disclaimed.

[21] Appl. No.: 635,298

[22] Filed: Jul. 27, 1984

Related U.S. Application Data

[63] Continuation-in-part of Ser. No. 486,330, Apr. 19, 1983, Pat. No. 4,503,012.

[51] Int. Cl.[4] .................... G01N 1/14

[52] U.S. Cl. .................... 436/180; 73/864.11; 222/386.5; 222/442; 222/632; 222/642; 417/140; 417/148; 417/395; 422/100

[58] Field of Search ............ 73/864.11; 222/95, 386.5, 222/442, 632, 642; 417/137, 148, 149, 394, 395; 422/81, 100, 80; 436/180, 52

[56] References Cited

U.S. PATENT DOCUMENTS

| | | | |
|---|---|---|---|
| 2,582,210 | 1/1952 | Stanton | 417/394 X |
| 2,899,280 | 8/1959 | Whitehead et al. | 23/230 |
| 3,012,863 | 12/1961 | Feichtmeir | 23/253 |
| 3,022,737 | 2/1962 | Tuckey | 417/394 X |
| 3,108,527 | 4/1965 | Wasilewski et al. | 222/70 |
| 3,180,278 | 4/1965 | Klein | 417/149 X |
| 3,666,420 | 5/1972 | Paatzsch | 422/81 |
| 3,749,526 | 7/1973 | Ferrentino | 417/394 X |
| 3,783,453 | 1/1974 | Bolie | 417/394 X |
| 3,827,304 | 8/1974 | D'Autry | 73/425.6 |
| 3,901,656 | 8/1975 | Durkos et al. | 23/230 |
| 3,929,411 | 12/1975 | Takano et al. | 23/259 |
| 3,999,511 | 8/1965 | Kulick | 128/214 |
| 4,231,990 | 11/1980 | Jottier | 422/81 X |
| 4,503,012 | 3/1985 | Starr | 436/180 X |

FOREIGN PATENT DOCUMENTS

| | | | |
|---|---|---|---|
| 471348 | 1/1929 | Fed. Rep. of Germany | 417/394 |
| 55-71950 | 5/1980 | Japan | 422/81 |
| 56-162057 | 12/1981 | Japan | 422/100 |
| 270654 | 1/1928 | United Kingdom | 417/394 |

*Primary Examiner*—Barry S. Richman
*Assistant Examiner*—Robert J. Hill, Jr.
*Attorney, Agent, or Firm*—Willian Brinks Olds Hofer Gilson & Lione

[57] ABSTRACT

Liquid-transfer equipment and method for dispensing liquid reagents for chemical assays, which equipment and method provide time-controlled metering of the quantity of liquid dispensed even though the liquid supply reservoir is not pressurized.

13 Claims, 2 Drawing Sheets

REAGENT-DISPENSING SYSTEM AND METHOD

BACKGROUND OF THE INVENTION

This application is a continuation-in-part of application Ser. No. 486,330 filed Apr. 19, 1983 and now U.S. Pat. No. 4,503,012.

The present invention relates to liquidtransfer equipment and method and, more particularly, to a method and apparatus for supplying reagents in liquid form to equipment by which assays of various specimens are made by the use of the reagent liquids.

For many years, assays in the field of chemical and biological assays, as well as other types of liquid-testing or other liquid-handling procedures, have utilized a step of adding small portions of a reagent or other particular liquid to other liquids being processed in some manner; and in many of these instances, including that of adding a portion of a reagent liquid to liquid specimens being analyzed or assayed, it is desired to add only a small and metered amount of the liquid or reagent being added.

With reference particularly to the field of chemical and biological assays and, more particularly, to those of approximately the last thirty years in which various types of automated or semiautomated analyzers have been used for such assays, different types of reagent-adding means have been used.

Illustrative of the variety of reagent-additive means is the following:

(a) In the U.S. Pat. No. 2,899,280 of Whitehead et al., a pressure device having a peristaltic pumping action is employed. The amount or proportion of each reagent which is added is dependent upon the diameter of the tubes in the peristaltic pump; but this is disadvantageous in that the tubes must be changed in order to change the proportions or amount of reagents added to a particular test.

(b) In the U.S. Pat. No. 3,012,863 of Feichtmeir, a pressure device is used which is similar to a syringe in that it displaces the reagent into a reaction vessel by a pumping-stroke effect. Even though such a device may be accurate, it must be mechanically adjusted to change the volume of the reagent dispensed; and it is difficult to cleanse such a device when changing to a different reagent.

(c) A pressurized reagent supply is also shown in the Durkos et al. U.S. Pat. No. 3,901,656.

In addition to disadvantages, as noted above, for pressurized reagent-supply methods, it has been discovered that the pressure method creates other problems. More particularly, it has been found that volumetric accuracy is impaired by pressure systems; and this causes a corresponding inaccuracy of certain assays whose accuracy is dependent upon accuracy of the volume of reagent added.

That is, it has been found that absorbance of the pressurizing gas, e.g., air or carbon dioxide, being dependent upon pressure, results in some of the gas being absorbed by the liquid when in the pressurized dispensing lines of pressurized dispensing, but then causes the gas precipitating out of solution when the pressure on the reagent liquid is reduced, as it is when the reagent has passed from its dispensing lines to a reaction vessel used in the assay; and the presence of bubbles in the solution can cause significant problems in certain observation procedures of the assay such as when using photometric procedures.

Moreover, the pressurizing gas itself would render many tests quite inaccurate, for the pressure causes greater absorbance of the gas; and the extra gas (such as $CO_2$ from the air) would be misread as a component of the specimen being assayed.

Another disadvantage of a pressurized supply source in liquid-dispensing apparatus is that extra wall strength is required for containers under pressure. Better utilization of storage space of the enclosure housings of automated equipment is thus achievable, considering both size and shape, if the reagent supply containers are not of pressurized type.

Moreover, any leakage, of pressure of a reagentdispensing system, which is dependent upon pressure for accuracy of the amount of reagent dispensed, is of course quite detrimental; and some leakages are especially difficult to avoid if the supply chambers of the reagents being dispensed are of pressurized type, for reagents have to be added or replaced frequently, and their 100 percent sealing in every instance is, of course, difficult to assure. Non-pressurized supply source dispensing, as by the present invention, avoids those problems; for only a portion of the dispensing conduit is pressurized, and that portion is not one requiring such handling.

Further, pressurized reagent-supply systems inherently require the bother of an extra step of venting when changing to the dispensing of a different reagent. Also, by a non-pressurized supply source, reagents may be added even during operation of the equipment.

Also a disadvantage of pressurized reagent systems is the fact that there are differences of the effect of any certain amount of pressure as dependent upon the height or head of liquid above its outlet.

Any single one of the disadvantages may, in many cases, not be itself of critical nature and may even be overcome or avoided by other factors of the equipment or of the assay; but considering the desire of extreme accuracy of many assays, the desire for rapid and fully effective changeover from one type of assay reagent to another, the desire for compactness of space requirements in automated assay equipment, the desire to avoid extra time of tests, the desire for a large number of different reagents usable in assays, the desire for rapidity of tests, etc., it has been found that metered reagent dispensing by pressure is undesired in many instances.

Non-pressure methods of reagent supply have been used, but apparently in only the slow and undesirable manual procedures such as the drawing of reagent liquid into a calibrated pipette tube, with a manual procedure of temporarily venting the tube to allow liquid to run out until it is of only a certain volume.

SUMMARY OF THE INVENTION

In carrying out the invention in a desired embodiment, there is provided an advantageous liquidtransfer system, such as for dispensing metered amounts of liquid reagent in a chemical assay procedure; and the liquid supply is not pressurized but is kept open to atmospheric pressure. A liquid-inlet line leads from the liquid supply chamber but branches into two lines, one of which leads to a pumping chamber and a second one of which leads to a valve in a dispenser outlet means.

A pumping means including a deformable bladder means is mounted in a housing, and the other side of the bladder means is open to and is controlled as to pressure by an actuation air means which leads from an external source of air under pressure, for achieving a pumping actuation of the bladder.

Associated control means, for both the valve in the dispenser line and in the actuation air means, cause a pumping operativity of the bladder for the desired dispensing of metered amounts of the reagent liquid, by controlling the length of time interval which the valve in the dispenser line is open from the pumping chamber to the dispenser outlet means. The metered amount of reagent liquids is, accordingly, a function of time, a relatively easily and precisely controllable factor; and the control for the dispenser line valve and for the air actuation means is coordinated such that the time interval, during which there is open communication between the pumping chamber and the dispenser outlet means, occurs entirely during a longer time interval during which the pumping chamber is under pressure of actuating air, this providing and assuring, at any given pressure, that amount of liquid dispensed is a function of time even though the supply chamber is of non-pressurized nature.

Desirably, as in both embodiments, the bladder is of a generally tubular shape; and the housing body, in which the bladder is mounted, also provides an outer wall to which the bladder is sealingly connected, the wall of the housing body and the other side of the bladder means providing a sealed chamber whose pressure variations achieve the pumping actuation of the bladder and whose pressure is dependent upon the actuation air means.

The dispenser line valve is a two-way valve means which in one setting provides a communication from the pumping chamber to the dispenser outlet, but in another setting such communication is blocked; and the air actuation means includes a three-way valve, which in one setting opens to vent or otherwise reduce the pressure against the underside of the bladder, but blocks venting of the line leading from the external air pressure source, and in a second setting opens communication between the associated source of compressed air and the underside of the bladder, but blocks any venting from either line.

Accordingly, the pumping actuation is achieved, precisely governed as to amount of reagent liquid dispensed, solely as a function of time, at any given pressure, even though it uses a non-pressurized supply source, and attains the advantages of a non-pressurized supply source.

The above description is of somewhat introductory and generalized form. More particular details, concepts, and features are set forth in the following and more detailed description of two illustrative embodiments, taken in conjunction with the accompanying drawings.

BRIEF DESCRIPTION OF THE DRAWINGS

FIG. 1 illustrates the components at an initial stage;

FIG. 2 illustrates the components at a second stage;

FIG. 3 illustrates the components at a still-later stage, although ready to start again the cycle beginning with FIG. 1;

DETAILED DESCRIPTION OF THE PREFERRED EMBODIMENTS

The concepts of the present invention provide an advantageous reagent-dispensing system; and by use of this system in any of its embodiments, the user may transfer a predetermined or optionally selected amount of fluid 10 from a supply tank 12 to a container which may be a reaction tube or other vessel 13. The components and concepts of the system will be specifically described in connection with their roles in the dispensing system.

Figure 1:
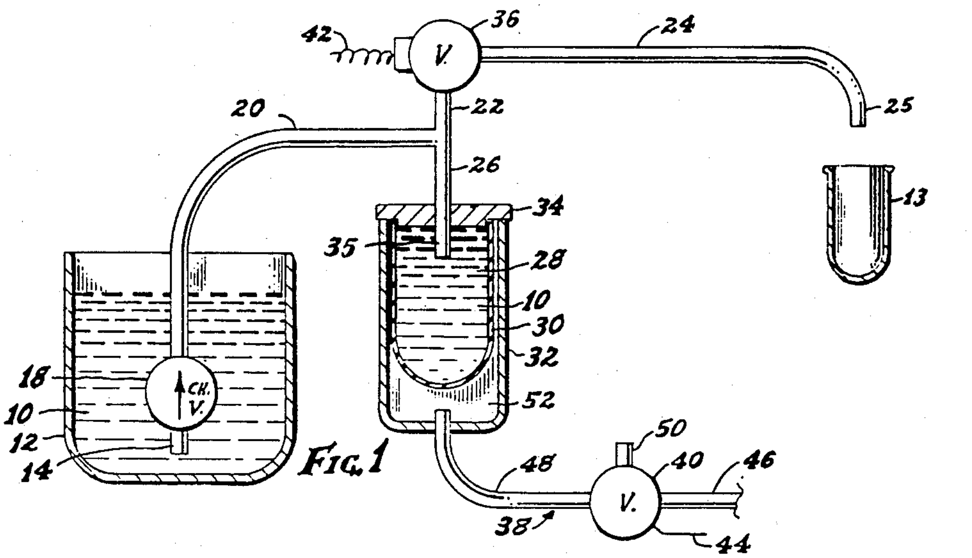
FIGS. 1, 2, and 3 are sequential views in use of a reagent-dispensing system according to an embodiment of the invention. In such views.
Figure 2:
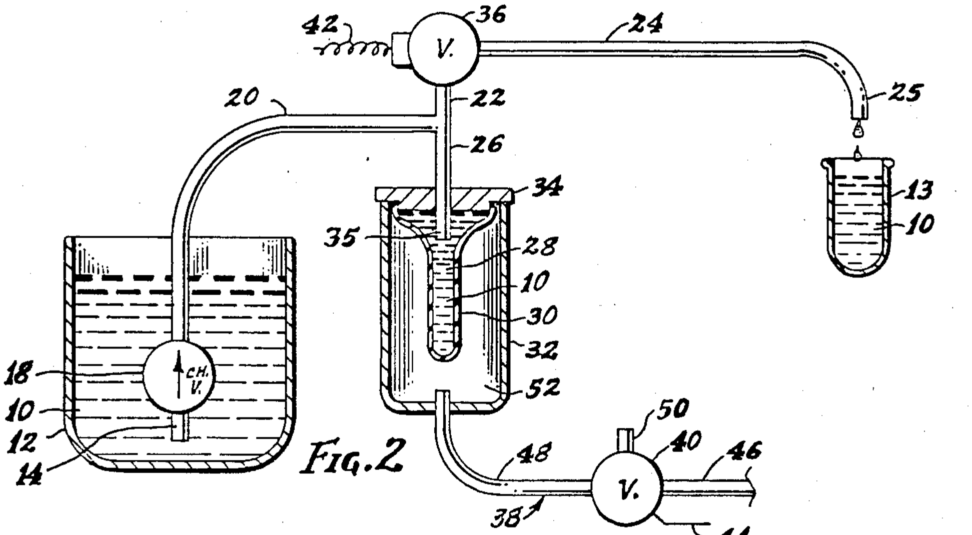
Figure 3:
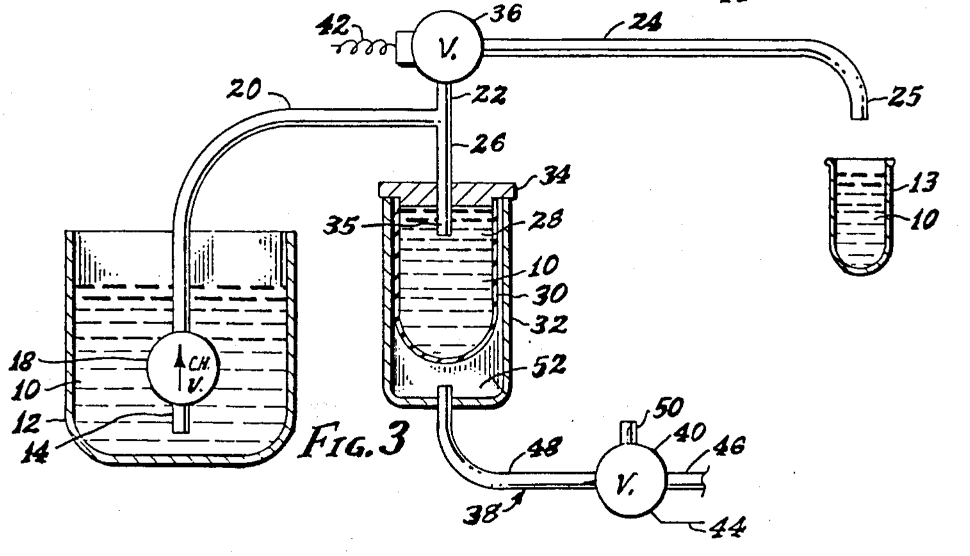

More particularly, the system as shown in FIGS. 1–3 comprises a supply tank 12 into which is disposed the inlet end 14 of piping having a check valve 18, and leading to piping sections 20, 22, and 24, for fluid transfer from the supply tank or chamber 12, which as shown is open to atmospheric pressure, through the dispenser components described herein to an outlet 25 of outlet line 24, to the associated container 13 which is to receive a metered quantity of the reagent liquid.

The piping section 22 has a downwardly extending branch line 26 which opens to a pumping chamber shown as an upper chamber 28 of a generally tubular-shaped bladder 30. The bladder 30 is shown as sealingly mounted in a bladder housing 32 which is sealingly covered by a cap 34, the piping branch 26 extending through the cap 34 in a sealed relationship and ending in an open-ended section 35. There is shown a solenoid-operated, two-way valve 36 between piping portions 22 and 24, operative as shown below.

Air line 38 leads from a pressurized air source (not shown) and contains a three-way valve 40, operative as herein specified; and the air line 38 is supplied with air at a desired pressure, conveniently 15 p.s.i., from the external source.

The two-way, solenoid-operated valve 36 and the three-way valve 40 are operated also from an associated or external control system (schematically shown by wires 42 connected to the solenoid valve 36, and a control line 44 connected to the three-way valve 40); but details of such controls are not part of the inventive concepts of the system.

FIGS. 1, 2, and 3 are sequential views, showing the cycle of operations to transfer the fluid 10 from supply tank 12 to container 13. At the initial position of the components, as shown in FIG. 1, the bladder 30 is shown full of fluid 10. (Bladder 30 is assumed to have become filled with fluid 10 by the operation of the system through several cycles of operation; but in explaining the operation, for ease of understanding, the initial stage of the illustrated sequence is presented as with the bladder filled.) Once the bladder 30 is initially filled; the operative cycle, as described herein, may begin.

In FIG. 1, the three-way air valve 40 is open, permitting air to flow in line 38 from the external pressure source (not shown), through a first air line portion 46, past the air valve 40 and into a second line portion 48. At this time or stage of actuation, the three-way valve exhaust port 50 of valve 40, however, is closed so as not to let the air pressure escape from lines 46 and 48.

The air from line portion 48 of the line 38 flows into the bladder housing 32 to a portion 52 beneath the bladder 30 and not in communication with the bladder chamber 28; and the air incoming through line portion 48 does not leave chamber 52 because the bladder housing 32 and its cap 34 form an air-tight seal.

Since the air is thus trapped in the housing 32 and particularly in chamber 52 beneath the bladder 30, air pressure builds up to the 15 p.s.i. supply pressure. The underside of the bladder 30 inside the bladder housing 32 is thus exposed to the 15 p.s.i. pressure.

The bladder 30 is not a rigid member and would collapse under this pressure except for the fact that in order to collapse, the lines 20, 26, and 22 being full of liquid, the bladder 30 would have to displace the fluid 10 inside the upper bladder chamber 28; however, the fluid 10 in the upper bladder chamber 28 cannot be displaced into line 26 since then the two-way valve 36 is closed, preventing movement of fluid through line portion 22, and the check valve 18 allows flow in line 20 only in the direction opposite from that which is incident to movement of fluid out the upper bladder chamber 28.

Therefore, in such a stage and time, the portions of fluid 10 in the upper bladder chamber 28 and in lines 20 and 22 are also under 15 p.s.i. pressure, opposing the 15 p.s.i. pressure exerted by the air pressure in the housing 32 in its chamber 52 between the bladder 30 and bladder housing 32; and accordingly, at that time and stage of operation, a state of static equilibrium exists.

FIG. 2 showns the next step in the cycle, which is the opening of the solenoid-operated, two-way valve 36 by control line 42. When valve 36 is opened, intercommunicating the dispenser lines 22 and 24, the pressure differential between lines 22 and 24 (line 24 being open to atmosphere in the region of the container 13) causes the fluid in line 22 to flow through valve 36 into line 24. As that flow occurs, i.e., the flow of fluid in line 22 flowing into line 24, the fluid 10 in the upper bladder chamber 28 flows into line 22 since there is still 15 p.s.i. pressure in lower housing chamber 52 between the bladder 30 and the bladder housing 32.

As the fluid is squeezed out of the upper bladder chamber 28, the bladder 30 collapses; and the fluid flows from the upper bladder chamber 28, through lines 26 and 22, then through open valve 36, and through line 24 out outlet 25 into the container 13.

The amount of fluid that will flow through line 24 into container 13 thus will be seen to depend on a time factor, i.e., how long the valve 36 remains open, assuming, of course, that sufficient fluid is available in the upper bladder chamber 28 for the metered amount of reagent dispensate desired. Regardless of the means of timing control of the valve 36, the amount of fluid transferred or dispensed is a function of time at any given pressure.

When the desired amount of fluid is thus transferred for the desired amount of reagent delivered to the vessel 13, the control 42 will cause the valve 36 to close; and this prevents further reagent fluid flow into outlet line 24 and into the container 13.

FIG. 3, as a still subsequent sequential showing, shows the last step in the cycle of operation. That is, after valve 36 closes as just described, the three-way air valve 40 is caused by its control 44 to open the communication of the exhaust port 50 of air valve 40 to line portion 48, and closes off first line portion 46.

At this time, the 15 p.s.i. pressure existing in housing chamber 52, between the bladder 30 and bladder housing 32, causes the air to flow from inside that chamber 52 of the bladder housing 32, through portion 48 of line 38 and valve 40, until the pressure returns to zero (gauge, of course) in lower bladder chamber 52 and line portion 48.

When the pressure on both sides of the bladder 30, i.e., in both the upper bladder chamber 28 and the lower bladder chamber 52, has no differential, both then being zero gauge pressure, the bladder 30 returns to its original shape, quite similarly to the action of the rubber tip of a medicine dropper returning to its shape after releasing pressure from the previously applied pinch of the user's fingers.

As the bladder 30 returns to its original shape, as shown in FIG. 3, however, its increasing of volume of the upper bladder chamber 28 tends to create a vacuum in that upper bladder chamber 28; and consequently more fluid 10 from the supply tank 12 flows, by the atmospheric pressure in supply tank 12, through the check valve 18, then through lines 20 and 26, and into the upper bladder chamber 28, until there is equalized the pressure on both sides of check valve 18.

At this time or stage, the upper bladder chamber 28 is again filled and waiting for the three-way valve 40 to open to connect lines 48 and 46 and start the cycle again, as per the stage at the showing of FIG. 1.

Figure 5:
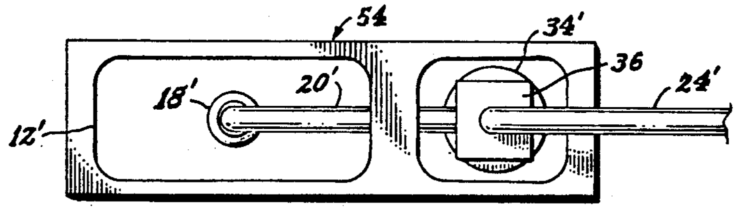
FIG. 5 is a top view of the integrated unit embodiment of FIG. 4.
Figure 4:
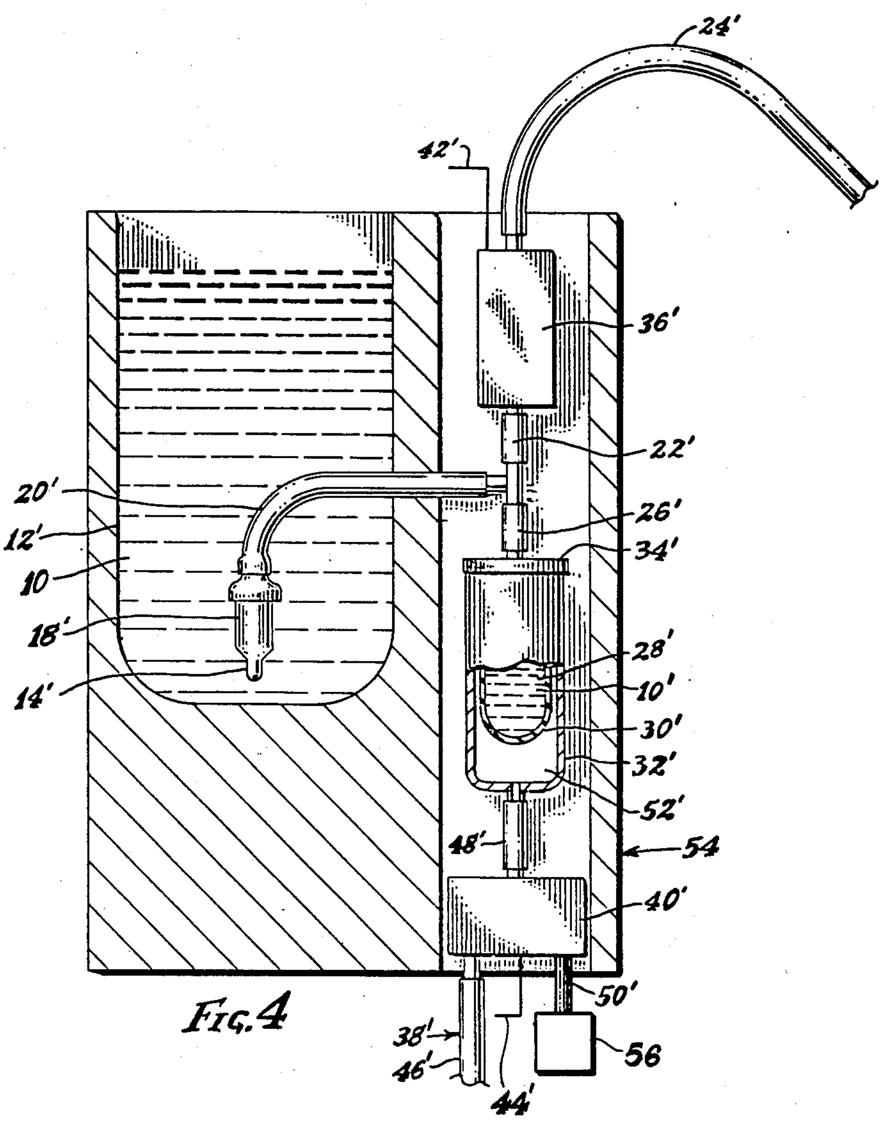
FIG. 4 illustrates an alternative embodiment of the invention in which all the operational components are integrated into a single housing or unit.

FIGS. 4 and 5 illustrate an alternative embodiment of the invention and also show how the reagent-dispensing system may be integrated into a single device or housing.

More particularly as to FIG. 4, the supply tank 12' with its check valve 18' and line 20', and the bladder housing 32' and valves 36' and 40', with their interconnected piping, are all located within an overall housing 54, only the reagent-dispensing line or conduit 24', and the air-admittance line 46' and air outlet line 50', being shown outside the housing 54.

The embodiment of FIGS. 4 and 5 differs from the embodiment shown in FIGS. 1–3 in that the air outlet line 50' is connected to a vacuum source 56 rather than being open to the atmosphere.

It will be recalled that as the last step in the cycle of operation of the system of FIGS. 1–3, the three-way air valve 40 was caused to open the lower bladder chamber 52 to the atmosphere through lines 48 and 50. Chamber 52 was under 15 p.s.i. pressure prior to operation of three-way valve 40. Upon operation of valve 40, the pressurizing air was permitted to flow out of chamber 52 to the atmosphere until the chamber 52 was at atmospheric pressure. This allowed the bladder 30 to expand and return from the shape shown in FIG. 2 to its original shape shown in FIG. 3. The corresponding expansion of upper bladder chamber 28 caused fluid 10 from supply tank 12 to be drawn into the upper bladder chamber until the pressure was equalized on both sides of check valve 18. Valve 40 was then again actuated to couple the 15 p.s.i. source to lower bladder chamber 52, and the system was carried through another cycle of operation.

By coupling lower bladder chamber 52' to vacuum source 56 rather than to the atmosphere in the embodiment of FIGS. 4 and 5, the pressure in chamber 52' can be reduced to less than atmospheric pressure. Under the influence of the vacuum, the bladder 30' is expanded to a somewhat greater extent than by simply opening chamber 52' to atmosphere. The bladder 30', in turn, creates an enhanced vacuum condition in upper bladder chamber 28' to help ensure that fluid 10' will be effectively drawn into chamber 28' from supply tank 12' to help ensure that chamber 28' will be reliably filled with fluid for every cycle of operation of the system. The system of FIGS. 4 and 5 can thus be operated more reliably and quickly. In addition, the need for elasticity in the bladder 30' is reduced since the forces on the bladder that result from the imposition of vacuum can replace and supplement the forces generated in an elastic bladder by its deformation.

In the embodiment of FIGS. 4 and 5, although the individual components are shaped somewhat differently from those of the embodiment of FIGS. 1–3, for brevity the correspondence between the two embodiments is shown merely by the individual components having the same numerical designation, those marked with a "prime" mark of FIGS. 4 and 5 corresponding functionally and operationally with similarly numbered parts, not carrying a "prime" mark, of the embodiment of FIGS. 1–3.

It is thus seen that a liquid-transfer system according to the inventive concepts, with a non-pressurized liquid supply source, as herein set forth, provides a desired and advantageous system yielding the advantages of ease of precise metering yet avoiding disadvantages of a pressurized liquid supply.

Accordingly, it will thus be seen from the foregoing description of the invention according to these illustrative embodiment, considered with the accompanying drawings, that the present invention provides new and useful combination concepts of a novel and advantageous liquid-transfer system as for metered dispensing of reagent liquids, yielding desired advantages and characteristics, and accomplishing the intended objects, including those hereinbefore pointed out and other which are inherent in the invention.

Modifications and variations may be effected without departing from the scope of the novel concepts of the invention; accordingly, the invention is not limited to the specific embodiments or form or arrangement of parts herein described or shown.

I claim:

1. A method for dispensing metered amounts of liquid comprising:

providing a deformable pumping chamber containing a liquid to be dispensed;

applying a positive pressure to the exterior surface of said deformable pumping chamber while blocking the flow of liquid from said pumping chamber to a dispenser means;

coupling the interior of said pumping chamber to said dispenser means for a predetermined period of time while maintaining the positive pressure to the exterior surface of said deformable pumping chamber, the positive pressure applied to the exterior surface of said pumping chamber causing said pumping chamber to contract resulting in a metered amount of liquid being dispensed from said pumping chamber to said dispenser means during said predetermined period of time;

blocking the flow of said liquid from said pumping chamber to said dispenser means after said predetermined period of time; and reducing the pressure applied to the exterior surface of said deformable pumping chamber to allow said pumping chamber to expand, the resulting reduced pressure within said expanded pumping chamber causing liquid within a supply means coupled to said pumping chamber to be withdrawn from said supply means into said pumping chamber for refilling said pumping chamber with said liquid.

2. A method as recited in claim 1 wherein said pressure reducing step comprises coupling the exterior surface of said deformable pumping chamber to the atmosphere.

3. A method as recited in claim 1 wherein said pressure reducing step comprises coupling the exterior surface of said deformable pumping chamber to a vacuum source.

4. A method as recited in claim 1 and further including the step of thereafter reapplying a positive pressure to the exterior surface of said refilled deformable pumping chamber for initiating a further dispensing cycle.

5. Apparatus for dispensing metered amounts of a liquid comprising:

liquid storage means for storing a liquid;

means for defining a deformable pumping chamber, said pumping chamber containing a supply of said liquid to be dispensed;

first couping means for coupling said liquid storage means to said pumping chamber;

dispenser means for dispensing liquid from said pumping chamber;

second coupling means for coupling said pumping chamber to said dispenser means, said second coupling means including first valve means having a valve closed position for blocking the flow of liquid from said pumping chamber to said dispenser means, and a valve open position for permitting the flow of liquid from said pumping chamber to said dispenser means;

means for defining a pressure chamber adjacent to at least a portion of said deformable pumping chamber;

a positive pressure source for pressurizing said pressure chamber;

a source of reduced pressure for reducing the pressure in said pressure chamber;

means for placing said first valve means in said valve closed position and for connecting said positive pressure source to said pressure chamber for pressurizing said pressure chamber while said first valve means is in said valve closed position for applying pressure against said means for defining said deformable pumping chamber;

means for actuating said first valve means to said valve open position for a predetermined period of time while maintaining said pressure chamber pressurized, said pressure in said pressure chamber compressing said pumping chamber to dispense a metered amount of liquid from said pumping chamber to said dispenser means through said second coupling means; and means for connecting said source of reduced pressure to said pressure chamber for reducing the pressure in said pressure chamber, said reduced pressure allowing said pumping chamber to expand, the resulting reduced pressure in said pumping chamber causing liquid to be withdrawn from said liquid storage means into said pumping chamber through said first coupling means for refilling said pumping chamber with said liquid.

6. Apparatus as recited in claim 5 wherein said source of reduced pressure comprises the atmosphere.

7. Apparatus as recited in claim 5 wherein said source of reduced pressure comprises a vacuum source.

8. Apparatus as recited in claim 5 wherein said positive pressure source comprises a 15 p.s.i. pressure source.

9. Apparatus as recited in claim 5 wherein said liquid comprises a chemical reagent to be dispensed in a chemistry analyzing system.

10. Apparatus as recited in claim 5 wherein said first coupling means includes one-way valve means for permitting liquid flow from said liquid storage means to said pumping chamber while preventing liquid flow into said liquid storage means from said pumping chamber.

11. Apparatus as recited in claim 10 wherein the liquid in said liquid storage means is exposed to atmospheric pressure.

12. Apparatus as recited in claim 5 wherein said means for connecting said positive pressure source to said pressure chamber and said means for connecting said source of reduced pressure to said pressure chamber comprises second valve means coupling said pressure chamber to said positive pressure source and to said source of reduced pressure.

13. Apparatus as recited in claim 12 wherein said second valve means comprises a three-way valve having a first position coupling said pressure chamber to said positive pressure source, a second position coupling said pressure chamber to said source of reduced pressure, and a third closed position.

* * * * *